UNITED STATES PATENT OFFICE.

MAX METH, OF LANCASTER, OHIO, ASSIGNOR TO THE LANCASTER LENS COMPANY, OF LANCASTER, OHIO, A CORPORATION OF OHIO.

MANUFACTURING RUBY-GLASS.

1,344,141. Specification of Letters Patent. Patented June 22, 1920.

No Drawing. Application filed November 22, 1918. Serial No. 263,668.

*To all whom it may concern:*

Be it known that I, MAX METH, a citizen of Austria, (first naturalization papers taken out,) residing at Lancaster, in the county of Fairfield and State of Ohio, have invented certain new and useful Improvements in Manufacturing Ruby-Glass, of which the following is a specification.

This invention relates to the art of manufacturing glass and is directed particularly to the manufacture of what is known as ruby glass. Heretofore, the introduction of the proper ingredients to produce the desired ruby color has been more or less expensive and it is my object to reduce this expense very materially by the introduction of cheaper materials whereby the same result is obtained. It will be understood that the invention is not limited to any particular use of this glass but relates only to the combination of elements introduced to produce the desired color.

Generally speaking, ordinary transparent glass is made of sand, soda-ash, lime, arsenic, and sulfur mixed in the proper proportions. Also, the desired ruby color has been effected in various manners such, for instance, as by the introduction of gold or copper solutions or selenium. Either of these elements when introduced in the proper proportions will produce the desired results. Similarly, a suitable mixture of cadmium sulfid with selenium but these mixtures involve a considerable monetary outlay.

In practising my invention, I do not limit myself to any particular ingredients or proportions for producing the ordinary transparent glass. In order to produce the desired color effect, I introduce into the ordinary glass bath a proper mixture of sulfate of antimony and crude tartar. Both of these latter ingredients may be purchased in the open market at a cost considerably less than those heretofore used and at the same time, the desired color effect may be produced.

What I claim is:

The method of producing ruby glass which consists in mixing with the ordinary transparent glass ingredients a suitable quantity of sulfate of antimony and crude tartar.

In testimony whereof I affix my signature.

MAX METH.

Witnesses:
W. J. FRITZ,
ALBERT STEINER.